(12) United States Patent
Logan et al.

(10) Patent No.: US 8,276,379 B2
(45) Date of Patent: Oct. 2, 2012

(54) SYSTEMS AND APPARATUS RELATING TO SOLAR-THERMAL POWER GENERATION

(75) Inventors: Thomas M. Logan, Ballston Lake, NY (US); Mark M. Meyers, Mechanicville, NY (US); Mark Shu, Clifton Park, NY (US); Thomas J. Frey, Bavaria (DE); Kevin R. Lang, Denver, CO (US); Mark S. Dudzinski, Alpharetta, GA (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 12/619,199

(22) Filed: Nov. 16, 2009

(65) Prior Publication Data

US 2011/0115226 A1    May 19, 2011

(51) Int. Cl.
*F03G 7/00* (2006.01)
(52) U.S. Cl. .................... 60/641.14; 60/641.15
(58) Field of Classification Search ..... 60/641.8–641.15
See application file for complete search history.

(56) References Cited

U.S. PATENT DOCUMENTS

| | | | |
|---|---|---|---|
| 7,615,884 B2* | 11/2009 | McMaster | 290/55 |
| 8,001,960 B2* | 8/2011 | Gilon et al. | 126/600 |
| 2002/0083946 A1 | 7/2002 | Karni et al. | |
| 2006/0048515 A1 | 3/2006 | Zimron et al. | |
| 2007/0095065 A1 | 5/2007 | Kaplan et al. | |
| 2008/0029150 A1 | 2/2008 | Quero et al. | |
| 2008/0078378 A1 | 4/2008 | Zhu | |
| 2008/0256952 A1* | 10/2008 | Litwin et al. | 60/641.8 |
| 2009/0229264 A1* | 9/2009 | Gilon et al. | 60/641.8 |
| 2010/0117372 A1* | 5/2010 | McMaster | 290/55 |

* cited by examiner

*Primary Examiner* — Hoang Nguyen
(74) *Attorney, Agent, or Firm* — Mark E. Henderson; Ernest G. Cusick; Frank A. Landgraff (57) ABSTRACT

The present application thus describes a solar-thermal power generation plant that includes one or more towers; a plurality of heliostats disposed around each of the one or more towers; a direct solar evaporator mounted at an elevated position on each of the one or more towers, the heliostats being configured to reflect solar radiation toward the direct solar evaporator such that concentrated solar radiation heats a receiving surface on the direct solar evaporator; and a heat engine mounted at an elevated position on each of the one or more towers, attached to the direct solar evaporator, and configured to use the heat from the receiving surface on the direct solar evaporator to generate electricity.

23 Claims, 4 Drawing Sheets

SYSTEMS AND APPARATUS RELATING TO SOLAR-THERMAL POWER GENERATION

BACKGROUND OF THE INVENTION

This present application relates generally to systems and apparatus relating to solar-thermal energy generation. More specifically, but not by way of limitation, the present application relates to systems and apparatus pertaining to distributed solar-thermal power generation.

Conventional solar-thermal power technologies generally include collectors that focus the energy from the sun so that the high temperatures needed for efficient power generation may be obtained. Generally, this type of generation includes large collector fields that concentrate energy into a heat transfer fluid, which is then pumped to a central plant where the heat it carries may be used. For example, the heat source may be used as part of a Rankine cycle to generate electricity. As discussed in more detail below, several different system technologies and/or plant layouts exist for collecting and using the energy of the sun. However, these conventional systems have proven to have very high start-up costs, be ineffective at meeting the requirements of certain power generating applications, and/or be ineffective at leveraging already available resources and technologies that enable effective smaller-scale distributed power generation. As a result, there is a need for improved systems and/or apparatus relating to the more efficient and cost effective generation of solar-thermal energy.

BRIEF DESCRIPTION OF THE INVENTION

The present application thus describes a solar-thermal power generation plant that includes one or more towers; a plurality of heliostats disposed around each of the one or more towers; a direct solar evaporator mounted at an elevated position on each of the one or more towers, the heliostats being configured to reflect solar radiation toward the direct solar evaporator such that concentrated solar radiation heats a receiving surface on the direct solar evaporator; and a heat engine mounted at an elevated position on each of the one or more towers, attached to the direct solar evaporator, and configured to use the heat from the receiving surface on the direct solar evaporator to generate electricity.

The present application further describes a solar-thermal power generation plant that includes a plurality of towers; a plurality of heliostats disposed around each of the towers; and a heat engine mounted at an elevated position on each of the towers. The heat engine may include: a direct solar evaporator (the heliostats being configured to reflect solar radiation toward the direct solar evaporator such that concentrated solar radiation heats a receiving surface on the direct solar evaporator; a turbine that is in fluid communication with the direct solar evaporator; a generator that is coupled to the turbine via a shaft; a condenser that is in fluid communication with the turbine; and a pump that is in fluid communication with the condenser and the direct solar evaporator. The solar-thermal power generation unit may be configured such that in operation the direct solar evaporator uses the heat collected on the receiving surface from the concentrated solar radiation to evaporate a working fluid flowing therethrough; the evaporated working fluid is expanded through the turbine; the turbine converts the energy of the expanding working fluid from the direct solar evaporator into mechanical energy of the rotating shaft; the generator converts the mechanical energy of the rotating shaft into electricity; the condenser condenses the working fluid; and the pump circulates the working fluid. The towers may be connected electrically to each other make a single connection to a power grid.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Solar-thermal energy generation generally is the collection and concentration of solar energy to produce heat that is then used to produce work and/or generate electricity. Several different system technologies or plant layouts exist for collecting the energy of the sun for this purpose. However, conventional systems have proven to have certain shortcomings. These include, for example, high start-up and maintenance costs, ineffectiveness at meeting the requirements of certain distributed power generation applications, unreliability, and/or ineffectiveness at leveraging already available resources and technologies that enable distributed power generation.

Figure 1:
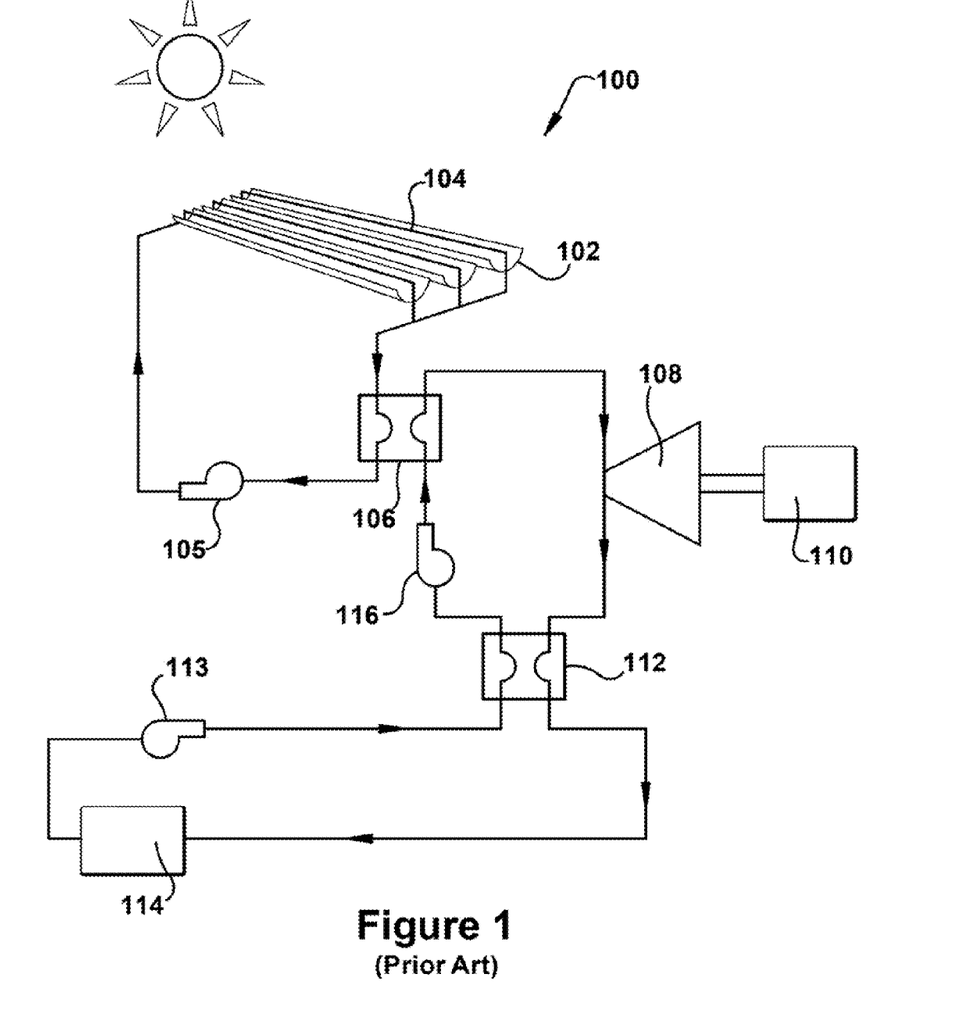
FIG. 1 is a schematic representation of a solar-thermal power generation plant according to conventional design.

One of the most common solar-thermal power generation plants uses a parabolic trough collector. A plant of this type is shown in FIG. 1, a trough power plant 100. As one of ordinary skill in the art will appreciate, trough power plant 100 uses a curved or parabolic trough 102 to reflect and concentrate solar radiation onto a receiver pipe 104 (also called an absorber or collector pipe). The receiver pipe 104 generally contains a heat transfer fluid, which is circulated by a pump 105. The receiver pipe 104 runs the length of the trough 102 above the curved reflecting surface.

In general, the curved trough 102 is configured into a long row that is usually oriented in a North to South direction. Full-scale trough systems or power plants consist of many such troughs laid out in parallel. This, as one of ordinary skill in the art will appreciate, generally requires a relatively large area of flat land for constructing this type of power plant. The trough 102 is generally parabolic in one direction and straight or linear in the other. Tracking the sun from East to West by rotation on one axis, the high precision reflector panels of the trough 102 concentrate the solar radiation coming directly from the sun onto the receiver pipe 104, which is located along the focal line of the trough 102. To compensate for the change of position of the sun orthogonal to the receiver, the trough 102 tilts so that the direct radiation remains focused on the receiver pipe 104. As discussed in more detail below, however, a change of position of the sun parallel to the trough 102 does not require adjustment of the mirrors, since the light is simply concentrated elsewhere on the receiver pipe 104.

The heat transfer fluid, which usually comprises a synthetic oil, molten salt or water, absorbs the heat of the concentrated sunlight as it moves through the receiver pipe 104. The pump 105 may circulate the heat transfer fluid such that it reaches relatively high temperatures, typically in the range of between approximately 250° and 600° C. After passing through the receiver pipe 104, the heat transfer fluid generally is piped to a heat exchanger 106 where it is used as a heat source to evaporate or boil a working fluid, which typically is water. The expanding working fluid then may be used to drive a turbine 108 that, in turn, may be used to drive a generator 110 to produce electricity. The flow of working fluid then may be directed through another heat exchanger or condenser 112, which also may be connected to a circuit that includes a pump 113 and cooling tower 114. Having been condensed in the condenser 112, the working fluid may be returned by a pump 116 and circulated again through the receiver pipe 104 where the cycle may begin anew.

Several advantages and disadvantages are generally associated with a thermal-solar power plant having trough design. One of the advantages is that the operation of the solar collectors is relatively simple and inexpensive when compared to other thermal-solar plants in that the trough solar collectors require solar tracking on only a single axis. As for some of the disadvantages, power plants designed with a trough collector system generally require long runs of trough collectors to heat the heat transfer fluid to an adequate temperature level. These long runs require a large power plant footprint, which also must be substantially level or flat, and extensive piping. This causes the start-up cost of these types of plant to be substantial, as well as resulting in relatively high operation and maintenance expenses. In addition, as one of ordinary skill in the art will appreciate, during circulation, significant heat loss generally occurs through the long runs of pipe. This typically requires the use of vacuum tubes encapsulating the pipes, which in turn require flexible joints for thermal expansion. The vacuum encapsulated pipe sections results in further capital costs. Energy also must be expended to circulate the heat transfer fluid through these long stretches of pipe. As one of ordinary skill in the art will appreciate, each of these issues has a negative impact on the efficiency of the system and/or adds cost to the system. Further, because plants that use trough design do not concentrate the energy of the sun as densely as other types of concentrator plants, they operate at relatively low temperatures, which, as with any heat engine, negatively impacts efficiency.

Figure 2:
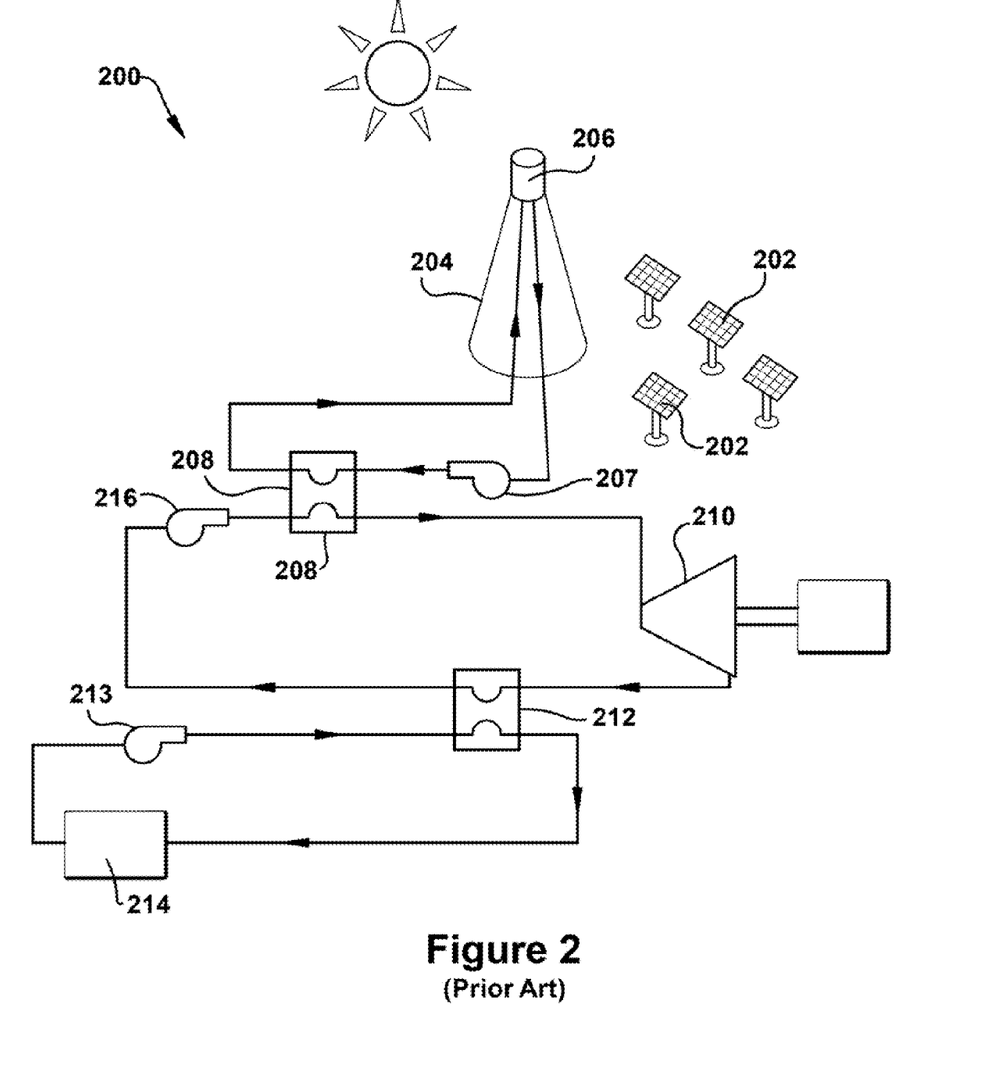
FIG. 2 is a schematic representation of a solar-thermal power generation plant according to an alternative conventional design.

Another type of solar-thermal power plant design is generally referred to as a power tower, or central receiver design. FIG. 2 illustrates a schematic layout of a conventional tower power plant 200, which, in general, includes an array of flat (or slightly concave) moveable mirrors, called heliostats 202, that are disposed around a tower 204 that has a receiver 206. In most applications, the tower 204 may be between 20 and 200 meters high, with the receiver 206 placed at or near the top of it. Generally, a large number of heliostats 202 are disposed around the tower 204. In some applications, between 2,000 and 20,000 heliostats 202 per tower 204 may be employed, depending on the size of the heliostat. In general terms, the heliostats 202 are controlled to track the sun such that the reflected energy strikes the receiver 206 as desired.

The reflected solar energy is used within the receiver 206 to heat a heat transfer fluid. The concentrated energy from the numerous heliostats 202 generally is denser than that of a trough design, and, thus, allows the solar-thermal power plants with a tower design to operate at relatively higher temperatures. As a result, typically, tower power plants attain temperatures at or in excess of 550° C. From the receiver 206, the heat transfer fluid is circulated via a pump 207 to a heat exchanger 208 located on the ground where it is used as a heat source to boil a working fluid, which typically is water. The expanding working fluid then may be used to drive a turbine 210 that, in turn, may be used to drive a generator 211 to produce electricity. The working fluid then may be directed through a condenser 212 (which may be connected to a pump 213 and cooling tower 214) and, being condensed, may be returned via a pump 216 to the receiver 206 where the cycle may begin again.

Several advantages and disadvantages are typically associated with a solar thermal power plant having a tower design. One advantage of this design is the relatively higher operating temperatures. As one of ordinary skill in the art will appreciate, thermal energy at higher temperatures is converted to electricity more efficiently and, though not shown in FIG. 2, can be more cheaply stored for later use. Furthermore, with a tower design, there is less need to flatten the ground area. In principle a power plant with a tower design can be built on a hillside or uneven terrain. Mirrors can be flat, which allows them to be manufactured less expensively than the parabolic troughs, and the piping runs, while still generally extensive, are typically shorter than trough designs and much of the piping is concentrated at the tower and central plant location. One of the primary disadvantages is that the mirrors require somewhat more complex and expensive control systems, as each heliostat must have dual-axis control to aim the reflected solar radiation at the receiver in a proper manner. In addition, while the piping systems are less extensive than those of plants with a trough collector, there still are long runs between the receiver and the heat exchanger/power plant. These runs result in greater expense, maintenance costs, and thermal operating losses.

Figure 3:
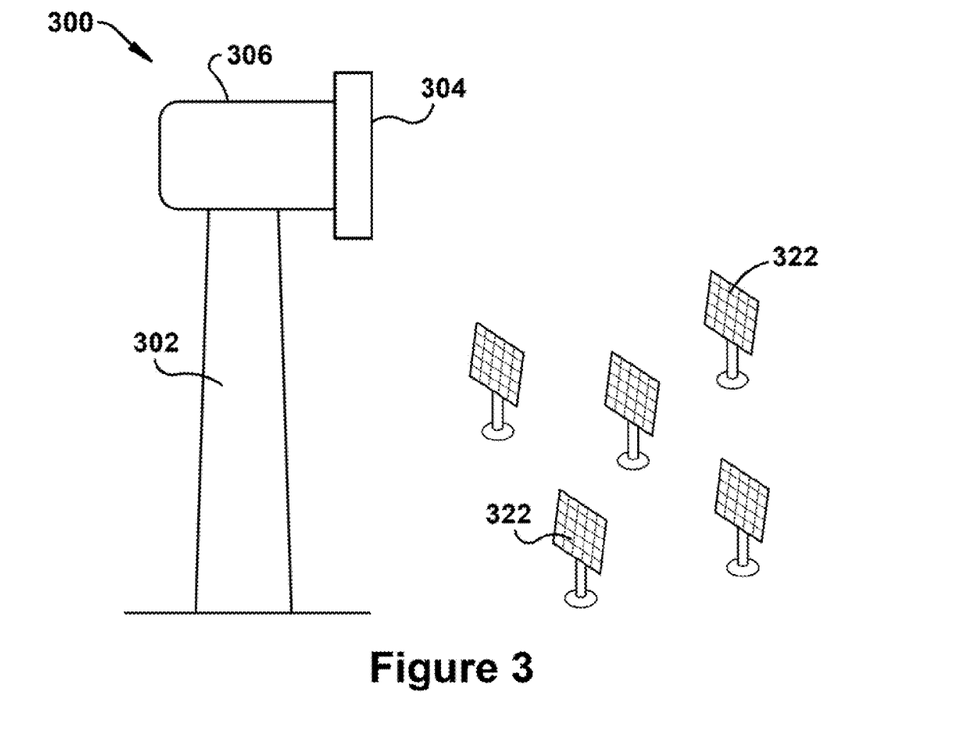
FIG. 3 is a schematic representation of a solar-thermal power generation unit according to an embodiment of the present application.
Figure 4:
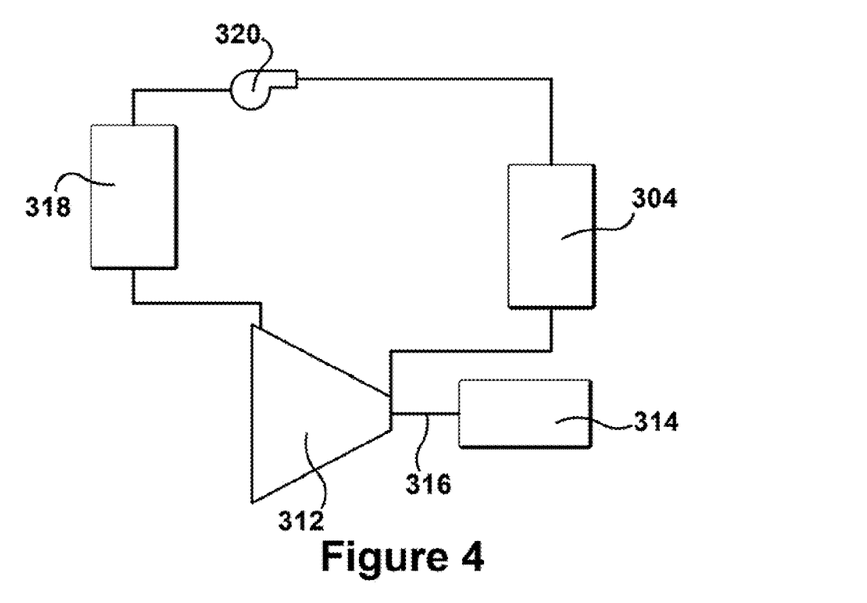
FIG. 4 is a schematic representation of an exemplary Rankine cycle that may be used in an embodiment of the present application.
Figure 5:
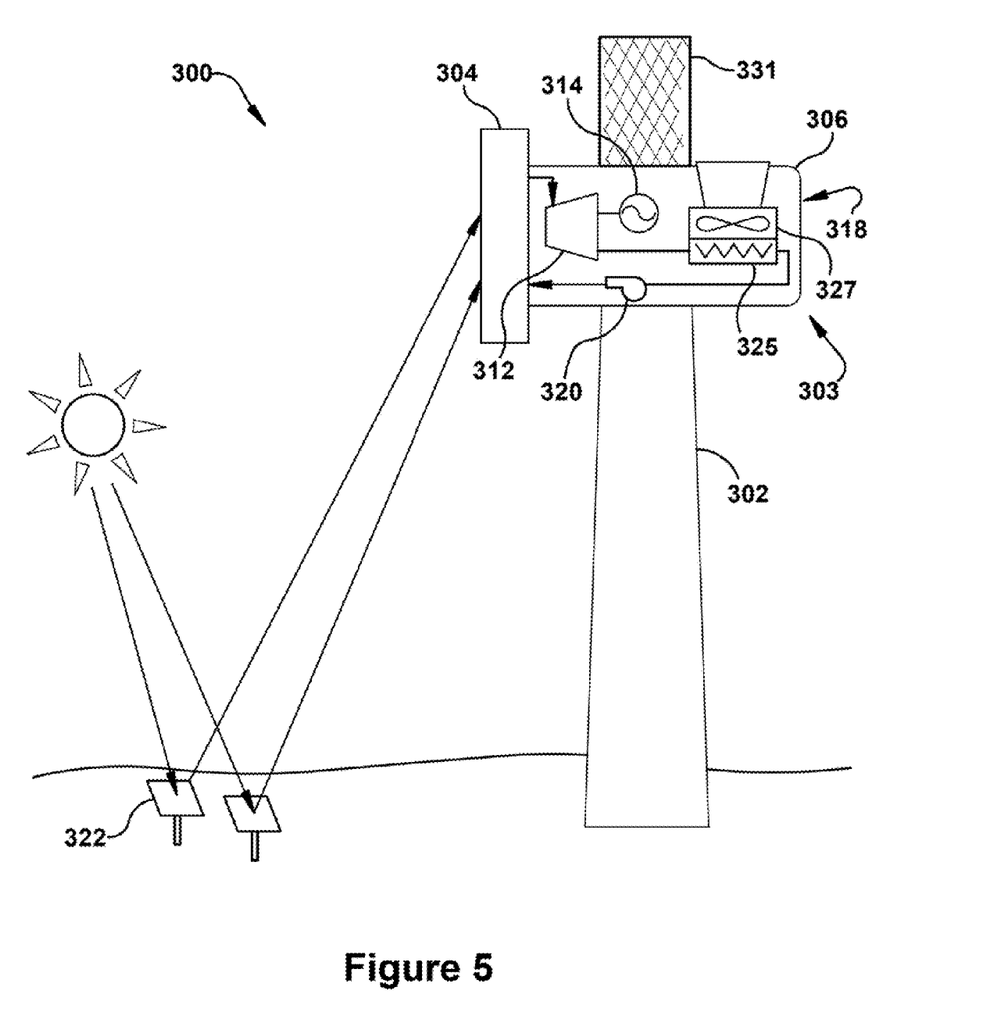
FIG. 5 is a schematic representation of the component configuration of a solar-thermal power generation unit according to an embodiment of the present application.

FIGS. 3, 4 and 5 show exemplary embodiments of the present invention. FIG. 3 illustrates a schematic representation of a solar-thermal tower-mounted power plant or unit 300. As shown, the solar-thermal tower-mounted power unit 300 may include a tower 302 and, mounted to the tower 302 in an elevated position, a power generating unit 303. The elevated power generating unit 303 generally comprises a heat engine that uses heat from the reflected sunlight to generate electricity. In some embodiments, the elevated power generating unit 303 may comprise a Rankine cycle power turbine, which, according to certain embodiments of the present invention, generally includes a boiler, in which a working fluid is evaporated, a turbine, through which the evaporated working fluid is expanded, a generator, which is coupled to the turbine via a common shaft for the generation of electricity, a condenser, which condenses the working fluid after it passes through the turbine, and a pump, which circulates the working fluid through the cycle.

More specifically, in an exemplary embodiment, the solar-thermal tower-mounted power unit 300 generally comprises an elevated power generating unit 303 that may include a direct solar evaporator 304, which generally serves as the boiler of the Rankine cycle, and a main housing 306, to which the direct solar evaporator 304 is attached and in which the other components of the power generating unit 303 are located. Within the main housing 306, as discussed in more detail below and shown more clearly in the schematic diagrams of FIGS. 4 and 5, the system may include a turbine 312 through which the evaporated working fluid is expanded, a generator 314, which is coupled to the turbine 312 via a common shaft 316, a condenser 318, which includes a heat exchanger by which the working fluid is cooled and condensed, and a conventional pump 320, which circulates the working fluid through the Rankine cycle.

As stated, in operation, the working fluid may be passed through the turbine 312 after it is evaporated within the direct solar evaporator 304. In other embodiments, an intermediate heat transfer fluid may be used to collect thermal energy within the direct solar evaporator 300 and, coupled to a heat exchange boiler (not shown), evaporate the Rankine cycle working fluid. The turbine 312 via conventional means may convert the energy of the expanding flow of working fluid into the mechanical energy of the rotating shaft 316, which, being coupled to the generator 314, is converted into electricity by the generator 314 pursuant to conventional means. The working fluid then may be condensed within the condenser 318, and, from the condenser, the pump 320 may compress and/or circulate the working fluid such that it returns to the direct solar evaporator 304 where the cycle may begin again.

Disposed around the tower 302 may be a plurality of heliostats 322. The heliostats 322 generally comprise a reflective surface, such as a mirror, that is flat or slightly concave. The heliostat 322 is configured to reflect solar radiation toward the direct solar evaporator 304 or, more particularly, and outer surface or receiving surface of the direct solar evaporator 304. When a relatively large number of heliostats 322 are used, as might be used in an exemplary embodiment of the present invention, the concentrated solar radiation provides the heat necessary to evaporate the working fluid passing through the direct solar evaporator 304. Generally, each of the heliostats 322 has conventional dual-axis control such that the heliostats 322 may track the sun through its daily course across the sky. In this manner, the heliostats 322 may consistently direct the reflected solar radiation so that it strikes the direct solar evaporator 304 as necessary. In some embodiments of the present invention, there might be between 1,000 and 30,000 heliostats, each having a surface area of between 1 and 100 square meters. In other preferred embodiments of the present invention, there might be between 10,000 and 20,000 heliostats, each having a surface area of between 1 and 2 square meters. The reflecting surface of the heliostats 322 may comprise any number of conventional reflective surfaces that are common to these types of applications. In some preferred embodiments, the reflective surface of the heliostats 322 may comprise silver, aluminum, or multi-layered dielectric coatings, or other similar materials.

In regard to the direct solar evaporator 304, in some embodiments, it generally includes conductive conduit through which the working fluid passes. As one of ordinary skill in the art will appreciate, the conductive conduit is configured and positioned such that the reflected energy from the heliostats strikes the conduit and thereby heats the working fluid. In some embodiments of the present invention, the direct solar evaporator 304 includes an arrangement of tubes or pipes fabricated of a suitable conductive metal that is appropriate given the type of working fluid being used. For example, if the working fluid is water, the conductive metal used for the conduit may be one of several grades of carbon or stainless steel. In addition, in alternative embodiments, the conductive metal used for the conduit may be a high-nickel alloy. The conduit or tubes in the direct solar evaporator may be configured such that the flow of working fluid is evenly distributed as it flows through. Particularly, the tubes may be arranged and positioned such that the reflected energy from the heliostats strikes an outer surface of the tubes or a conductive material that is adjacent to the outer surface of the tubes. The conductive metal of the tubes then efficiently passes the reflected energy to the working fluid flowing through the conduit, thereby evaporating and/or superheating the working fluid. In some embodiments, the direct solar evaporator 304 may include a material, such as graphite, against which the reflected solar energy is directed and through which the flow of working fluid is directed. To continue this example, the heated graphite passes the reflected solar energy to the working fluid while also provided a level of thermal storage for periods during which solar energy collection is low, such as when passing clouds obscure the rays of the sun. In some embodiments, the system further may include multiple sections with moisture separators and/or dryers that recycle droplets and liquid into the entrance of the evaporator.

As stated, the solar-thermal tower-mounted unit 300 may generate electricity using a Rankine cycle. In some exemplary embodiments, the working fluid of the Rankine cycle may be water. In other embodiments, for example, where high operating temperatures are more difficult to attain, the Rankine cycle may employ an alternative working fluid, such as an organic, high molecular mass fluid that has a boiling point occurring at a lower temperature than the liquid water-steam phase change. This type of Rankine cycle, which often is referred to as an organic Rankine Cycle, may allow Rankine cycle energy generation at lower temperatures, which may be necessary or desirable for certain applications. In some preferred embodiments that use an organic Rankine Cycle, the working fluid of choice may be Toluene, butane, benzene or other similar fluids. In one alternative embodiment, a molten salt may be used as a heat transfer fluid within a heat exchanger to produce a supply of steam. In this type of embodiment, the supply of molten salt may be configured such that a heated supply of molten salt is maintained in a storage vessel of some kind. The amount of the heated supply of molten salt may be configured to provide a storage of thermal energy that may be used during a period when the amount of collected solar energy is low (i.e., during a period when clouds block the sun's rays). The level of thermal energy storage may be manipulated such that the plant may continue to produce energy for a desired period of time during which solar collection is low.

In some exemplary embodiments, the turbine 312 may comprise a steam turbine or a turboexpander designed for organic fluids. In a preferred embodiment, the steam turbine or the organic fluid turboexpander may be an axial flow turbine. Alternatively, in other embodiments, the steam turbine or the organic fluid turboexpander may be a radial inflow or screw expander type of turbine engine.

In regard to the generator 314, in some embodiments, it may comprise a conventional wind turbine generator. More specifically, in one preferred embodiment, a directly driven turbine generator that is used in wind turbine applications may be used.

In regard to the condenser 318, in some embodiments, it may comprise an air-cooled condenser that requires no external consumption of water. In this case, the condenser 318 may rely on fans or natural convection to draw air across the cooling surfaces of the condenser 318, thereby condensing the working fluid. At locations with suitable water availability, a conventional wet or hybrid condenser 318 also may be used.

Embodiments of the solar-thermal tower-mounted power unit may be used as a discrete or independent power generating unit. This type of application may be used to supply the necessary power in a cost-effective manner at a remote installation of some kind. Alternatively, embodiments of the present application may comprise several of the solar-thermal tower-mounted power units described herein linked together electrically and connected to the grid, similar to how a plurality of independent wind turbines is connected to each other and the grid to form wind farms. In this manner, discrete power generating units may be constructed independently and connected to the grid sequentially in a modular fashion. This capability may allow projects to proceed in phased construction such that power may be generated before the entire power plant is completed, which may provide greater economic feasibility for certain types of power plant installations.

Generally, it has been found, given equipment size constraints and other factors, that sizing each of the solar-thermal tower-mounted power units to particular ranges of power generating capabilities provides the best results in terms of reliability, constructability, distributed power generating capabilities, and cost-effectiveness. As such, the solar-thermal tower-mounted power units according to embodiments the present invention generally comprise a power generating capability of between one and fifty megawatts. In other more preferable embodiments, the solar-thermal tower-mounted power units according to the present invention comprise a generating capability of between two and five megawatts.

In addition, unlike conventional systems, it has been discovered that, using embodiments of the present invention, a distributed approach to solar power energy generation becomes feasible. Particularly, a distributed approach using multiple towers, as described above, becomes a cost-effective and efficient alternative for certain power generating applications, especially where start-up capital is limited and/or where a phased or expanding power generating capabilities may be needed. In such circumstances, according to embodiments of the present application, a plurality of the solar-thermal tower-mounted units may be used, with each having its own field of heliostats. These units may be electrically connected and then a single connection to the power grid for the field of multiple tower units may be made.

Referring now to FIG. 5, a schematic view of the interior of the main housing 306 is shown. This view illustrates a configuration and component layout according to an exemplary embodiment of the present invention. More specifically, as illustrated and as discussed previously, the solar-thermal tower-mounted unit 300 generally comprises a tower 302 a power generating unit 303 that is mounted to the tower 302 in an elevated position. The height at which the power generating unit 303 is mounted to the tower 302 may vary depending on the application; however, in some preferred applications, the power generating unit 303 is mounted at least 30 meters above the ground. More preferably, the power generating unit 303 is mounted at a range of between approximately 40 and 100 meters above the ground.

As illustrated, the direct solar evaporator 304, which generally serves as the boiler of the Rankine cycle, may be mounted to the main housing 306, and provides an outer surface against which the plurality of heliostats 322 are focused. Downstream from the direct solar evaporator 304 and in fluid communication therewith, the turbine 312 may be located. Adjacent to the turbine 312 and connected via a common shaft, the generator 314 may be located, as illustrated. Generally, at the opposite end of the main housing 306 from the direct solar evaporator 304, the condenser 318 is located. From the turbine 312, the working fluid may be directed through a heat exchanger 325 of the condenser 318. The working fluid may be cooled in the heat exchanger 325 by a flow of air that is drawn through the heat exchanger 325 by a fan 327. The discharge of heat exchanger 325 may be expelled via exhaust 329. Downstream from the heat exchanger 325 and in fluid communication therewith, the conventional pump 320 may be located. The pump 320 may circulate the working fluid and, thereby, direct the condensed working fluid from the condenser to the direct solar evaluator 304, where the cycle may begin again. Other configurations are also possible. In addition, as discussed above, an intermediate heat transfer fluid may be used in some embodiments. Also, a water cooled condenser may also be used in certain applications.

As also illustrated in FIG. 5 by the shaded region, the tower may include a tower extension 331 (the continuation of which is not shown). As used herein, the tower extension 331 generally comprises a continuing of the tower 302 above the height at which the power generating unit 303 is positioned. The tower extension 331 provides the capability to integrate the solar-thermal power generating unit described above with a conventional wind turbine power generating unit. The combination of solar-thermal generation with wind generation is desirable for several reasons, including the fact that generally the peak periods for each are out of phase. That is, solar-thermal power generation generally peaks during the daylight hours, whereas, wind generation generally peaks at night. For applications needing more balanced or even power generation throughout the entire day, combining wind and solar power generation in this manner, particularly considering the cost-savings that flow from the combination (which include the use of a common tower and common electrical connection to the grid) proves effective.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A solar-thermal power generation plant, comprising:
one or more towers;
a plurality of heliostats disposed around each of the one or more towers;
a direct solar evaporator mounted at an elevated position on each of the one or more towers, the heliostats being configured to reflect solar radiation toward the direct solar evaporator such that concentrated solar radiation heats a receiving surface on the direct solar evaporator; and
a heat engine mounted at an elevated position on each of the one or more towers, attached to the direct solar evaporator, and configured to use the heat from the receiving surface on the direct solar evaporator to generate electricity;
wherein the heat engine comprises:

a turbine that is in fluid communication with the direct solar evaporator;

a generator that is coupled to the turbine via a common shaft;

a condenser that is in fluid communication with the turbine; and a pump that is in fluid communication with the condenser and the direct solar evaporator; and wherein:

the direct solar evaporator is mounted to a first end of a main housing and provides the receiving surface against which the plurality of heliostats are focused;

downstream from the direct solar evaporator and in fluid communication therewith, the turbine is positioned within the main housing;

adjacent to the turbine and connected via a common shaft, the generator is positioned within the main housing; and at a second end of the main housing that s substantially opposite from the first end of the main housing, the condenser is positioned.

2. The solar-thermal power generation plant of claim 1, wherein:

the one or more towers comprises at least two towers;

the at least two towers are connected electrically; and the at least two towers make a single connection to the power grid.

3. The solar-thermal power generation plant of claim 1, wherein the heat engine comprises one of a Rankine cycle power turbine and an Organic Rankine cycle power turbine.

4. The solar-thermal power generation plant of claim 1, wherein the solar-thermal power generation plant is configured such that in operation: the direct solar evaporator uses the heat from the concentrated solar radiation to evaporate a working fluid;

the evaporated working fluid is expanded through the turbine; the turbine converts the energy of the expanding working fluid from the direct solar evaporator into mechanical energy of the rotating shaft; the generator converts the mechanical energy of the rotating shaft into electricity; the condenser condenses the working fluid; and the pump circulates the working fluid; and wherein the direct solar evaporator, the turbine, the generator, the condenser, and the pump each are connected to the tower at an elevated position.

5. The solar-thermal power generation plant according to claim 1, wherein:

the plurality of heliostats comprises between 1,000 and 30,000 heliostats, each of which have a surface area of between 1 and 100 square meters; and the heliostats comprise one of the following reflective materials: silver and aluminum, and multi-layered dielectric coatings.

6. The solar-thermal power generation plant according to claim 1, wherein:

the plurality of heliostats comprises between 10,000 and 20,000 heliostats, each of which have a surface area of between 1 and 2 square meters; and the heliostats comprise one of the following reflective materials: silver and aluminum, and multi-layered dielectric coatings.

7. The solar-thermal power generation plant according to claim 1, wherein the direct solar evaporator comprises a conduit through which the working fluid passes, the conduit being configured and positioned such that the reflected solar radiation from the heliostats strikes the conduit and thereby heats the working fluid passing therethrough.

8. The solar-thermal power generation plant according to claim 7, wherein the conduit of the direct solar evaporator includes an arrangement of tubes comprising a conductive metal.

9. The solar-thermal power generation plant according to claim 3, wherein the heat engine includes a working fluid, and wherein:

in the case of the Rankine cycle power turbine, the working fluid comprises water; and in the case of the Organic Rankine cycle power turbine, the working fluid comprises an organic, high molecular mass fluid that has a boiling point occurring at a lower temperature than the liquid water-steam phase change.

10. The solar-thermal power generation plant of claim 1, wherein the turbine comprises one of an axial flow turbine, a radial inflow turbine, and a screw expander turbine.

11. The solar-thermal power generation plant of claim 1, wherein the generator comprises a wind turbine generator.

12. The solar-thermal power generation plant of claim 1, wherein the condenser comprises one of an air-cooled condenser, a wet condenser, and a hybrid condenser.

13. The solar-thermal power generation plant of claim 1, wherein the direct solar evaporator, the turbine, the generator; and the condenser are configured such that the solar-thermal power generation plant comprises a power generating capability of between 1 and 50 megawatts.

14. The solar-thermal power generation plant of claim 1, wherein the direct solar evaporator, the turbine, the generator; and the condenser are configured such that the solar-thermal power generation plant comprises a power generating capability of between 2 and 5 megawatts.

15. The solar-thermal power generation plant of claim 1, the elevated position on the tower at which the direct solar evaporator and the heat engine are mounted comprises a height of at least 30 meters above the ground.

16. The solar-thermal power generation plant of claim 1, the elevated position on the tower at which the direct solar evaporator and the heat engine are mounted comprises a height of at between approximately 40 and 100 meters above the ground.

17. The solar-thermal power generation plant of claim 1, wherein:

the heliostats comprise dual-axis control.

18. The solar-thermal power generation plant of claim 1, further comprising:

a tower extension, the tower extension comprising a continuation of the tower above the elevated height at which the heat engine and the direct solar evaporator are positioned; and a wind turbine attached to a distal end of the tower extension.

19. The solar-thermal power generation plant of claim 1, wherein the direct solar evaporator further comprises means for thermal energy storage.

20. The solar-thermal power generation plant of claim 19, wherein the means for thermal energy storage comprises a solid material through which a working fluid of the heat engine is passed and that is configured to store the thermal energy required to maintain energy production by the heat engine at a desired level for a desired period of time during which solar energy collection by the heliostats is below a predetermine level.

21. The solar-thermal power generation plant of claim 20, wherein the solid material comprises graphite.

22. The solar-thermal power generation plant of claim 19, wherein the means for thermal energy storage comprises a supply of molten salt wherein:

the supply of molten salt comprises a heat transfer fluid that is heated within the direct solar evaporator and used in a heat exchanger to heat a working fluid of the heat engine; and the supply of molten salt is configured to store the thermal energy required to maintain energy production by the heat engine at a desired level for a desired period of time during which solar energy collection is below a predetermined level.

23. A solar-thermal power generation plant, comprising:

a plurality of towers;

a plurality of heliostats disposed around each of the towers; and a heat engine wholly contained in a housing, the housing being mounted at an elevated position on each of the towers;

wherein the heat engine includes:
- a direct solar evaporator, the heliostats being configured to reflect solar radiation toward the direct solar evaporator such that concentrated solar radiation heats a receiving surface on the direct solar evaporator;
- a turbine that is in fluid communication with the direct solar evaporator;
- a generator that is coupled to the turbine via a shaft;
- a condenser that is in fluid communication with the turbine; and
- a pump that is in fluid communication with the condenser and the direct solar evaporator;

wherein the solar-thermal power generation plant is configured such that in operation each of the direct solar evaporators uses the heat collected on each of the receiving surfaces from the concentrated solar radiation to evaporate a working fluid flowing therethrough; the evaporated working fluid is expanded through each of the turbines; each of the turbines converts the energy of the expanding working fluid from the direct solar evaporators into mechanical energy of the rotating shafts; each of the generators converts the mechanical energy of the rotating shafts into electricity; each of the condensers condenses the working fluid; and each of the pumps circulates the working fluid; and wherein the towers that are connected electrically to each other make a single connection to a power grid.

* * * * *

UNITED STATES PATENT AND TRADEMARK OFFICE
CERTIFICATE OF CORRECTION

PATENT NO.       : 8,276,379 B2                                   Page 1 of 1
APPLICATION NO.  : 12/619199
DATED            : October 2, 2012
INVENTOR(S)      : Logan et al.

It is certified that error appears in the above-identified patent and that said Letters Patent is hereby corrected as shown below:

In Column 4, Line 1, delete "design," and insert -- design --, therefor.

In Column 9, Line 19, Claim 1, delete "s" and insert -- is --, therefor.

Signed and Sealed this
Fourth Day of December, 2012

David J. Kappos
*Director of the United States Patent and Trademark Office*